US012739275B2

(12) United States Patent
Dambra et al.

(10) Patent No.: US 12,739,275 B2
(45) Date of Patent: Sep. 15, 2026

(54) SYSTEM AND METHOD FOR DETECTION AND MITIGATION OF NETWORK-BASED COMPUTING THREATS

(71) Applicant: Gen Digital Inc., Tempe, AZ (US)

(72) Inventors: Savino Dambra, Nice (FR); Javier Aldana Iuit, Praha-Modřany (CZ); Iskander Sanchez Rola, Redwood City, CA (US)

(73) Assignee: Gen Digital Inc., Tempe, AZ (US)

( * ) Notice: Subject to any disclaimer, the term of this patent is extended or adjusted under 35 U.S.C. 154(b) by 200 days.

(21) Appl. No.: 18/794,192

(22) Filed: Aug. 5, 2024

(65) Prior Publication Data

US 2026/0039684 A1 Feb. 5, 2026

(51) Int. Cl.
*H04L 9/40* (2022.01)

(52) U.S. Cl.
CPC ...... *H04L 63/1441* (2013.01); *H04L 63/1416* (2013.01); *H04L 63/1425* (2013.01)

(58) Field of Classification Search
CPC ............. H04L 63/1416; H04L 63/1425; H04L 63/1441
See application file for complete search history.

(56) References Cited

U.S. PATENT DOCUMENTS 11,240,267 B1 * 2/2022 Depaolo ................ G06N 20/00
11,810,117 B1 11/2023 Naamneh
11,849,002 B1 12/2023 Sanchez Rola et al.
12,579,314 B1 * 3/2026 Marimuthu ......... G06F 21/6263
2012/0047121 A1 * 2/2012 Canel .................... G06F 16/957 707/711
2019/0014149 A1 1/2019 Cleveland et al.
2019/0334947 A1 * 10/2019 Govardhan ........... G06F 16/951
2019/0394049 A1 12/2019 Hartwig et al.
2021/0314352 A1 * 10/2021 Yadav ................. H04L 63/1483

(Continued)

OTHER PUBLICATIONS

Liu et al., "Visualwebbench: How far have multimodal llms evolved in web page understanding and grounding ?." arXiv preprint arXiv:2404.05955. Apr. 9, 2024. Retrieved on Sep. 22, 2025. Retrieved from URL:https://arxiv.org/pdf/2404.05955.

(Continued)

*Primary Examiner* — Daniel B Potratz
*Assistant Examiner* — Matthias Habtegeorgis
(74) *Attorney, Agent, or Firm* — Dovas Law, P.C.

(57) ABSTRACT

A system and method of controlling access to a webpage is provided. A plurality of webpages are crawled respectively at a plurality of network addresses on a network. A plurality of images of the plurality of webpages are captured. A plurality of identifiers are determined based on the plurality of images and the plurality of network addresses. A particular webpage at a particular network address is detected, and it is determined that the particular webpage includes a mechanism for user data extraction. A particular image of the particular webpage is captured responsive to the determining that the particular webpage includes the mechanism for user data extraction. A particular identifier is determined based on the particular image and the particular network address. The particular identifier is compared to the plurality of identifiers, and access by a particular computing device to the particular webpage is controlled based on the comparing.

23 Claims, 5 Drawing Sheets

(56) References Cited

U.S. PATENT DOCUMENTS

| | | | | |
|---|---|---|---|---|
| 2023/0291751 | A1* | 9/2023 | Wasicek | H04L 63/1425 |
| 2024/0236102 | A1* | 7/2024 | Shieh | H04L 63/083 |
| 2025/0298851 | A1* | 9/2025 | Shriram | G06F 16/953 |

OTHER PUBLICATIONS

Gur et al., "Understanding html with large language models." arXiv preprint arXiv:2210.03945. May 19, 2023. Retrieved on Sep. 22, 2025. Retrieved from URL:https://arxiv.org/pdf/2210.03945.

International search report dated Sep. 29, 2025 for PCT/US2025/040616.

* cited by examiner

SYSTEM AND METHOD FOR DETECTION AND MITIGATION OF NETWORK-BASED COMPUTING THREATS

FIELD OF INVENTION

The disclosure relates generally to computer security, and more particularly to identifying and protecting against deceptive electronic interactions.

BACKGROUND

Internet users are frequently at risk from webpages configured to extract user data for illegal, disreputable, or otherwise objectionable purposes. Webpages that are configured to operate in an illicit manner may include features to give the impression that such webpages are operated by or associated with a particular legitimate entity. For example, a website enabled for illicit purposes may include logos, language, and protocols designed to mimic the design of a legitimate website or legitimate entity.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of controlling access to a webpage is provided. The method includes crawling a plurality of webpages respectively at a plurality of network addresses on a network and capturing a plurality of images of the plurality of webpages, each of the plurality of webpages corresponding to one or more of the plurality of images. The method further includes determining a plurality of identifiers based on the plurality of images and the plurality of network addresses. Network browsing activity by a particular user is monitored via a particular browser executed by a particular computing device. Access to a particular webpage at a particular network address is detected by the particular computing device via the particular browser executed by the particular computing device. The method further includes determining via the particular browser that the particular webpage includes one or more mechanisms for user data extraction and capturing via the particular browser one or more particular images of the particular webpage responsive to the determining that the particular webpage includes the one or more mechanisms for user data extraction. One or more particular identifiers are determined based on the one or more particular images and the particular network address. The one or more particular identifiers are compared to the plurality of identifiers, and access by the particular computing device to the particular webpage is controlled via the particular browser based on the comparing of the one or more particular identifiers to the plurality of identifiers.

A further method of controlling access to a webpage is provided. The method includes crawling a plurality of webpages respectively at a plurality of network addresses on a network and capturing a plurality of images of the plurality of webpages, each of the plurality of webpages corresponding to one or more of the plurality of images. A plurality of identifiers are determined based on the plurality of images and the plurality of network addresses. A particular webpage is detected at a particular network address, and it is determined that the particular webpage includes one or more mechanisms for user data extraction. One or more particular images of the particular webpage are captured responsive to the determining that the particular webpage includes the one or more mechanisms for user data extraction. One or more particular identifiers are determined based on the one or more particular images and the particular network address. The one or more particular identifiers are compared to the plurality of identifiers. Access by a particular computing device to the particular webpage is controlled based on the comparing of the one or more particular identifiers to the plurality of identifiers. Controlling the access by the particular computing device to the particular webpage can include blocking the access by the particular computing device to the particular webpage.

A network-enabled threat mitigation system is provided including a first computing system including at least a first processor and at least a first non-transitory computer readable storage medium having encoded thereon first instructions that when executed by the at least the first processor cause the first computing system to perform a first process. The first process includes crawling a plurality of webpages respectively at a plurality of network addresses on a network, capturing a plurality of images of the plurality of webpages, each of the plurality of webpages corresponding to one or more of the plurality of images, and determining a plurality of identifiers based on the plurality of images and the plurality of network addresses. The network-enabled threat mitigation system further includes a second computing system including at least a second processor and at least a second non-transitory computer readable storage medium having encoded thereon second instructions that when executed by the at least the second processor cause the second computing system to perform a second process. The second process includes receiving the plurality of identifiers from the first computing system, detecting access to a particular webpage at a particular network address via a particular browser, and determining via the particular browser that the particular webpage includes one or more mechanisms for user data extraction. The second process further includes capturing via the particular browser one or more particular images of the particular webpage responsive to the determining that the particular webpage includes the one or more mechanisms for user data extraction and controlling the access to the particular webpage via the particular browser based on the plurality of identifiers, the one or more particular images, and the particular network address.

BRIEF DESCRIPTION OF THE DRAWINGS

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENTS

A system described herein implements processes for performing network-based computing threat detection and prevention, for example phishing detection and prevention. The system and processes are scalable in that the system can automatically learn brands corresponding to entities, their visual representations, dependencies, and legitimate domains in a network web-based environment. The system and processes are flexible in that the system can improve recall by identifying impersonation and data-extraction mechanisms by leveraging screenshots, source code, and metadata.

As described herein, reference to "first" and "second" components (e.g., a "first computing system," a "second computing system") or "particular" or "certain" components or implementations (e.g., a "particular identifier," a "particular computing device," a "particular webpage") is not used to show a serial or numerical limitation or a limitation of quality but instead is used to distinguish or identify the various components and implementations.

Figure 1:
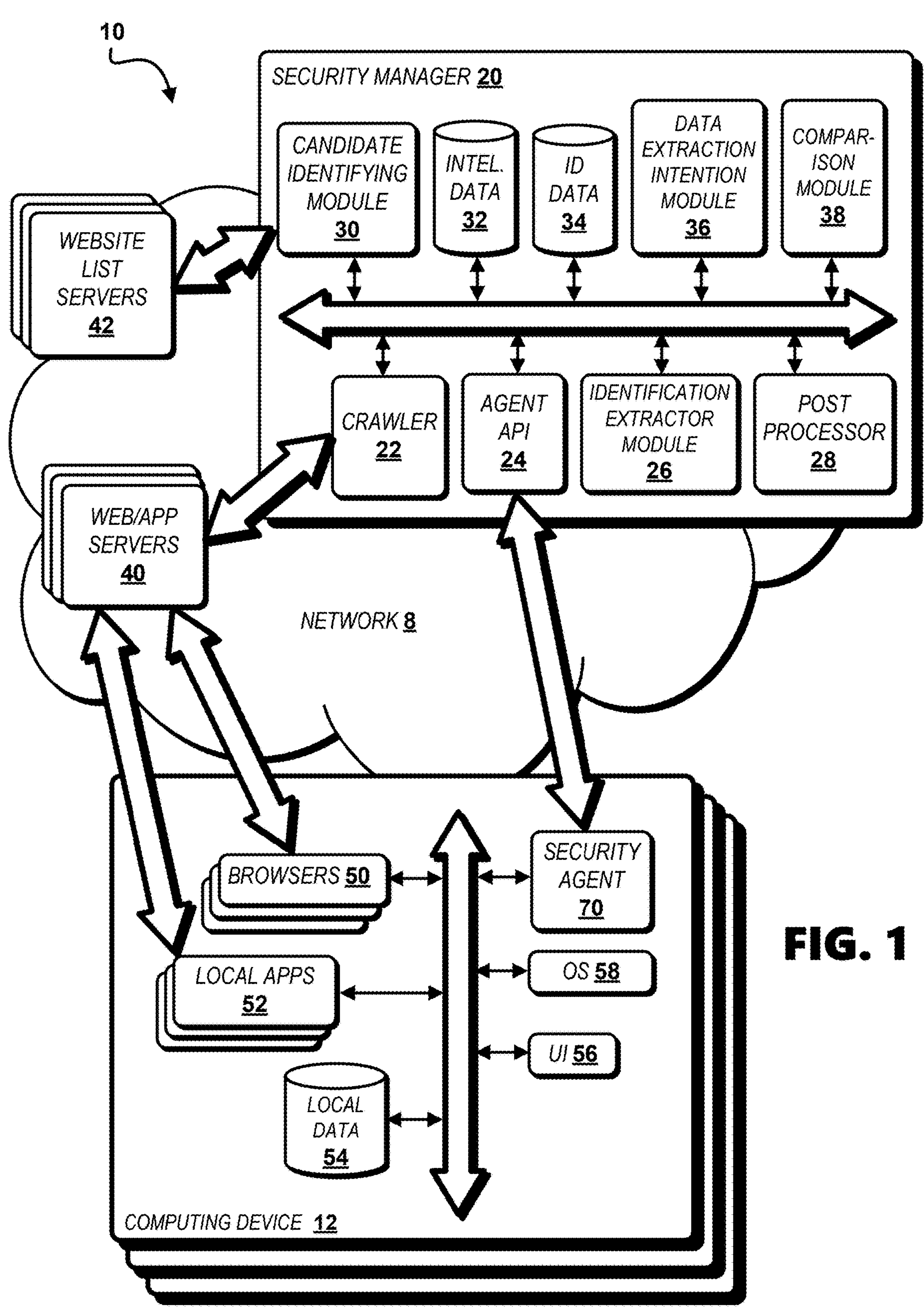
FIG. 1 shows an environment in which a network-connectable processor-enabled security manager facilitates assessing network-based threats to a computing device which executes a security agent configured to mitigate threats.

Referring to FIG. 1, an environment 10 enabled by a computer network 8 is illustrated in which a network-connectable processor-enabled security manager 20 assesses webpages for the purpose of detecting threats to computing devices 12. The computer network 8 includes one or more wired or wireless networks or a combination thereof, for example a local area network (LAN), a wide area network (WAN), the internet, mobile telephone networks, and wireless data networks such as Wi-Fi™ and 3G/4G/5G cellular networks. A security agent 70 integrated with a browser application ("browser") 50 of a computing device 12 enables monitoring and control of network browsing by a user of the computing device 12. The security agent 70 further monitors messages, message attachments, and downloads to the computing device 12 via the browser 50 as well as the browsing history and clickstream of a user on the computing device 12 via the browser 50. The monitoring by the security agent 70 provides the security manager 20 with intelligence data including data files and ordered sequences of hyperlinks followed by a user at one or more webpages or other network destinations, which data is beneficially stored in de-identified form in an intelligence datastore 32.

Web or application ("web/app") servers 40 can enable online services including network-based applications, webpages, electronic message provider systems (e.g., email provider systems), or other online services accessible via a browser application ("browser") 50 or via a local application 52. The web/app servers 40 can further function to enable the local applications 52 or components of local applications 52. A user is enabled to engage an online service enabled by a web/app server 40, for example by registering a user account for which account credentials (e.g., username, password) are created by the user or an administrator of the service. The security manager 20 can gather intelligence data in the form of data files and content from web/app servers 40 via a crawler 22, which data is stored in the intelligence datastore 32.

The security manager 20 is coupled to a computing device 12 and enables threat detection and mitigation to be provided to the computing device 12 via a security agent 70. The security agent 70 monitors user activity on the computing device 12 including messaging (e.g., email and text messaging), use of local and network-based applications, and access of websites and of particular content on local and network-based applications and websites, which data is fed to the security manager 20 via an agent application program interface ("API") 24 and stored in the intelligence datastore 32, and which data is used in threat detection and mitigation. The security agent 70 is executed on a plurality of computing devices 12 of a plurality of users allowing aggregation by the security manager 20 of de-identified data from the plurality of computing devices 12.

The security agent 70 is provided integral with, for example as an extension or plugin, to one or more browser applications ("browsers") 50 and provides notices to a user via a user interface 56 of the computing device 12. The security agent 70 can further be provided integral with one or more local applications 52. The security agent 70 gathers user actions including logins, browsing history, and clickstreams from a browser 50 with which it is integrated with, which data is transmitted to the security manager 20 via the agent API 24 and stored in the intelligence datastore 32. The security manager 20 provides threat information to the security agent 70 via the agent API 24 for enabling the security agent 70 to provide notifications to a user and to filter and block network-based threats confronted by a browser 50 or a local application 52, which threat information can be stored in a local datastore 54.

The security agent 70 engages with local applications 52, for example standalone applications, plugins, add-ons, or extensions to existing applications, to manage threats confronted by the local applications 52. The local applications 52 can include, for example, email clients or clients for other messaging protocols. Threats can include malicious emails including malicious attachments or links to malicious data on a network (e.g., the internet). The security agent 70 monitors actions performed via the local applications 52 including logins to online services (e.g., electronic messaging applications) enabled by the local applications 52 to collect data, which data is transmitted to the security manager 20 via the agent API 24 and stored in the intelligence datastore 32. An operating system 58 (hereinafter "OS 58") is executed on the computing device 12 which enables integration of the security agent 70 with the browsers 50 and local applications 52.

Figure 2A:
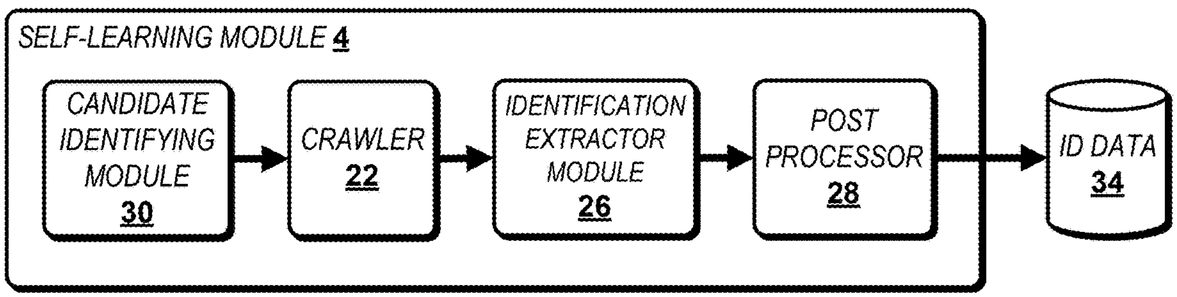
FIG. 2A shows a process flow enabled by a self-learning module enabled by the security manager of FIG. 1.

Referring to FIG. 2A, components of the security manager 20 enable a self-learning module 4 that manages identifying information of legitimate, non-malicious, online entities. Components of the security manager 20 further enable an assessment module 6 enabled to evaluate an unknown network destination to determine whether the network destination (e.g., a webpage or entire website) is configured to perform malicious activity (e.g., phishing).

In performing learning processes, the self-learning module 4 via a candidate identifying module 30 uses lists of frequently visited websites (e.g., top-visited websites) as determined by the security agent 70 installed on a plurality of computing devices 12 operated by a plurality of users to identify a starting point for building a list of identifiable brands corresponding to entities. Alternatively, the self-learning module 4 uses third-party public or private website ratings information (e.g., Tranco™ or Cisco Umbrell™) available through third-party website list servers 42 to identify a starting point for building a list of identifiable brands. Beneficially, acquired lists of identifiable brands are reliable, reflect the prevalence of identifiable brands, and identify non-malicious, benign websites. Further, acquired lists of identifiable brands are beneficially updated frequently (e.g., daily) based on use data monitored and aggregated by the security agent 70 or data aggregated via website list servers 42. The lists can be enriched with an industry type associated to each delineated website (e.g., social-media, finance, ecommerce, sport) by using local classification services implemented by the candidate identifying module 30 or by using third-party classification services (e.g., DuckDuckGo™ APIs, Google™ Search). Beneficially, the self-learning module 4 on-demand prioritizes specific sectors (e.g., finance over sport) that are typically targeted by phishing attacks. By looking at the frequently visited websites lists, the self-learning module 4 via the candidate identifying module 30 extracts a list of candidate websites to process (e.g., by selecting only the top 1,000,000 or 100,000 most frequently visited domains) and extracts brand names and brand parent information from public data sources (e.g., via DuckDuckGo™ APIs, Google™ Search).

Once candidate websites are identified, the crawler 22 navigates to each candidate website and collects relevant information including HTML documents, screenshots, source code, and certificates. Further, the crawler 22 collects Whois records of each candidate website from a registrar of the domain of each candidate website or from other Whois record data repository.

The identification extractor module 26 leverages the information collected during the candidate website identification and the crawling by the crawler 22 to infer one or more identifiers, for example one or more identifiers associated with a brand or alias corresponding to an entity. The identifiers are stored in the identifier datastore 34. Information leveraged to determine an identifier includes an association between a website and a brand name or alias learned during the candidate website identification or crawling. Other information used to determine an identifier includes the location of a logo and identification of a logo (e.g., identification of a main logo) on one or more crawled webpages.

The locating and identifying of a logo (e.g., identifying of a main logo) is performed by the identification extractor module 26 by implementing one or more dedicated vision-based models that identify logos and infer a main logo (in the case of multiple logos that are presented on a webpage) by analyzing the webpage layout. Alternatively, the locating and identifying of a logo is performed by one or more multimodal models that process both screenshot and source code (text) trained to analyze both visual and textual logos with contextually relevant prompts to query AI chatbots using chain-of-thoughts or few-shot prompting in a language-independent fashion. Inputs to a multimodal model (e.g., an open-source CLIP™ or Llama™ model) include for example a captured image and corresponding HTML or JavaScript code. Heuristics are applied to extract key information. Heuristics include focusing on images with particular keywords, running optical character recognition ("OCR") on particular regions of a screen, and running a large language model ("LLM") on specific webpages (e.g., "About," "Contact," and "Privacy Policy" named webpages) of a website or website areas (e.g., a webpage header or footer) with an ad-hoc engineered prompt.

In an exemplary implementation of the self-learning module 4, the identification extractor module 26 trains or fine-tunes a multimodal model (e.g., an open source CLIP™ or Llama™ model) based on a list of frequently visited websites as determined by the security agent 70 installed on a plurality of computing devices 12 or as provided by a third-party service provider (e.g., Tranco™ or Cisco Umbrella™). The multimodal model is fine-tuned or trained by inputting screen captures of one or more webpages of one or more websites from the list and one or more of HTML code or JavaScript code of the respective webpage. The list of frequently visited websites can be labeled for example based on a domain name (e.g., "company.example.com") or header or footer (e.g., "Example Company, Inc."), the labeling corresponding to the desired output which can include for example a brand (e.g., "Example Company"). The output of the multimodal model functions as one or more identifiers, for example one or more identifiers associated with a brand.

The post processor 28 performs one or more post processing phases to merge a plurality of identifiers corresponding to a plurality of brands into one or more identifiers corresponding to a particular brand which is stored in the identifier datastore 34, or to create a hierarchy to create merge data which is stored in the identifier datastore 34. For example, two brands can be merged if they depict the same visual logo in their webpages, suggesting the two brands may represent one bank operating in different countries. In another example, two brands can be merged if their certificate is validated by the same organization, suggesting the two brands may correspond to related organizations (e.g., a parent, subsidiary, or alias). A hierarchy is established if the joined information acquired by the candidate identifying module 30 and the crawler 22 reveal a parent-child relationship. A hierarchy can be established by analyzing public data (e.g., via Google™ Search, DuckDuckGo™ APIs) or by running a language model on crawled webpages (e.g., "About," "Contact," and "Privacy Policy" webpages) or on footer text (e.g., "2024 Instagram from Meta"). The post processing phases are important to avoid false positives erroneously indicating a malicious website, for example a false positive occurring as a result of comparing a website of a bank operating in a particular country to a known legitimate website of the same bank operating in another country.

The merging of different identifiers corresponding to different brands is facilitated for example by accessing public sources that report hierarchies (e.g., Wikipedia™, which indicates parent organizations of entities) and by analyzing screen captures collected by the crawler 22 (e.g., merging identifiers corresponding to the same captured logo). Whois registration details collected by the crawler 22 are used by the post processor 28 to determine if two or more identifiers represent the same legal entity or correspond to the same owner, in which case the post processor 28 merges the two or more identifiers. Merging of different identifiers corresponding to different brands can be performed based on content of the crawled pages (e.g., the footer on Facebook™ indicates related "Meta™ company"). HTTPS certificates collected by the crawler 22 are used to determine if two or more identifiers corresponding to two or more brands represent the same legal entity or correspond to the same owner, which information is used by the post processor 28 in determining to merge the two or more identifiers into one or more identifiers corresponding to a particular brand. For example, if two domains are validated by the same organization, the two domains belong to the same organization.

Figure 2B:
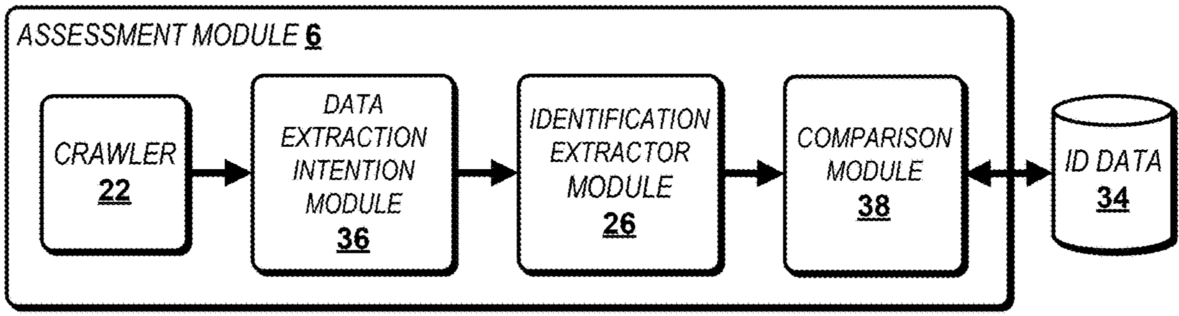
FIG. 2B shows a process flow enabled by an assessment module enabled by the security manager of FIG. 1.
Figure 2C:
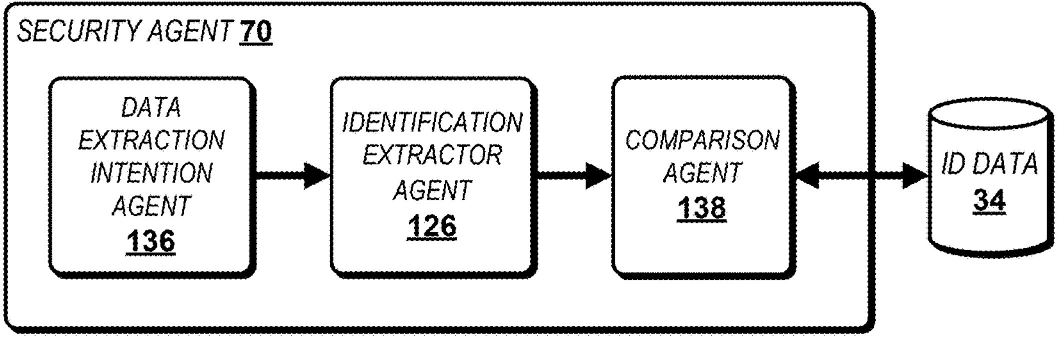
FIG. 2C shows a process flow enabled by the security agent executed by the computing device of FIG. 1.

The self-learning module 4 can scale without human intervention by adapting the popularity threshold of the domains in the candidate list (e.g., top 10,000 domains, top 100,000 domains, top 1,000,000 domains). Security tools implemented by the post processor 28 are used to scan these popular websites and ensure the absence of malicious pages. The self-learning module 4 refines a list of identifiers respectively corresponding to identified brands and their corresponding metadata at a specified frequency (e.g., weekly, monthly). For each brand corresponding to an entity, the self-learning module 4 returns a name, a list of aliases, discovered logos, and a list of legitimate domains, which information is stored as the one or more identifiers corresponding to the brand, and referring to FIGS. 2B and 2C, which information is used during an assessment phase performed by an assessment module 6 or the security agent 70.

As in the self-learning module 4, in the assessment module 6 the crawler 22 is used to crawl a candidate website. However, the assessment module 6 implements the crawler 22 to crawl websites to determine whether the websites are engaged in malicious (e.g., phishing) activity, which websites are not in a website list used by the self-learning module 4. The same set of properties and data are collected by the assessment module 6 as are collected by the self-learning module 4 (i.e., HTML documents, screenshots, source code, certificates, and Whois records).

A phishing webpage or website is characterized by an intention to extract precious personal data (e.g., credentials or credit card details). The data extraction intention module 36 verifies this intention by using the data collected by the crawler 22 to determine the presence of one or more mechanisms for user data extraction. This is achieved with heuristics that analyze HTML to detect the presence of forms with password inputs or credit-card related fields such as expiration date or Card Verification Value (CVV). Alternatively, a language model is applied by the data extraction intention module 36 that takes HTML and a prompt crafted with chain-of-thought reasoning and/or screen shots to recognize data extraction intention in a language independent fashion. Alternatively, a multimodal language model is applied by the data extraction intention module 36 that is fed with HTML and one or more screenshots of one or more webpages to determine a data extraction intention. If the data extraction intention module 36 determines no data extraction intention (e.g., an analyzed webpage is not asking for credentials), further analysis is halted thereby saving resources. Further, by implementing the data extraction intention module 36, the chance of a false positive is reduced, for example the chance of erroneously determining a phishing attack from a website that is not requesting sensitive data from a user.

For detecting data extraction intention on a webpage, places in the webpage configured to receive user input are identified by the data extraction intention module 36. Identification is achieved in different manners, for example based on heuristics or a dedicated model. For example, the data extraction intention module 36 can check if the HTML "<form>" tag is present on a webpage and if one or more input boxes on the webpage are called "username" or "password." The data extraction intention module 36 can train a deep learning model to analyze a screenshot and identify the regions in which one can insert credentials. The data extraction intention module 36 can use a large language model ("LLM") that analyzes the source code of a webpage and query the LLM whether in the webpage there is any data extraction intention, independent of the language of the webpage. Use of an LLM is highly effective in overcoming any potential language barriers, for example arising in analyzing non-English webpages. The data extraction intention module 36 can use a multimodal model that simultaneously uses a screenshot of a webpage and the source code of the webpage as an input to determine a data extraction intention, which is particularly useful if the source code is obfuscated.

If in implementing the assessment module 6, the data extraction intention module 36 successfully identifies the presence of data-extraction capabilities on a webpage or a website, the identification extractor module 26 determines one or more identifiers of the webpage or the website in the manner implemented by the self-learning module 4 in the self-learning phase. A comparison module 38 compares the one or more identifiers of the webpage or website with data-extraction capabilities to the identifiers of the candidate webpages and websites stored in the identifier datastore 34 which had been inferred by the self-learning module 4 via the identification extractor module 26 to determine if the webpage or website with data-extraction capabilities is impersonating a particular brand. If the webpage or website with data-extraction capabilities is determined to impersonate a particular brand and the domain of the webpage or website is not legitimate for the particular brand, the webpage or website is marked as a phishing webpage or website. The agent API 24 provides a notification to the security agent 70 that the webpage or website is a phishing webpage or website.

In an alternative implementation, the functionality of the data extraction intention module 36, the identification extractor module 26, and the comparison module 38 are performed locally on a computing device 12 by the security agent 70 respectively via a data extraction intention agent 136, an identification extractor agent 126, and a comparison agent 138. The security agent 70 functions as a browser integration (e.g., a browser extension or plugin) allowing for running malicious webpage detection logic on a computing device 12 via a browser 50. This has advantages over a system that for example runs detection logic on a backend system and sends a client a list of URLs that are malicious. Advantages of implementing a data extraction intention module 36, identification extractor module 26, and comparison module 38 via the security agent 70 include timing, efficacy, and personalization. Regarding timing, users of a computing device 12 implementing the security agent 70 do not have to wait for one URL to be selected on a backend system, crawled, analyzed, and sent back as part of a blocklist. Regarding efficacy, given limited computational resources, it is impractical to select all malicious URLs to be crawled in the backend, and the security agent 70 can detect harmful URLs that may otherwise evade detection in a backend process. Regarding personalization, the security agent 70 can personalize a model based on network targets a user is likely to encounter. For example, based on the popularity of Facebook.com™ it would be beneficial for all users of computing devices 12 to be protected against malicious sites seeking to impersonate Facebook.com™. However, it may not be efficient to protect a user of a computing device 12 located in Australia against malicious sites seeking to impersonate a regional bank in South Africa.

Conventional phishing detection pipelines that use visual similarity are typically based on a closed-list approach. In such conventional systems, a set of popular network targets likely to be impersonated are known, and the goal is to match the set of popular network targets to malicious network targets (e.g., phishing webpages) located on the internet. In conventional systems, the effort of adding new network targets is manual and requires a human analyst to look for visual information and domain information. The system enabled by the security manager 20 and security agent 70 enables a fully automated process based on prevalence lists that reflect current popular brands in the real world, or among users of computing devices 12, leading to an increase in coverage. The modularity of the solution enabled by the security manager 20 and security agent 70 helps in improving precision by verifying whether a webpage exhibits data-extraction credentials. The identification extractor module 26 does not compute similarity by comparing whole webpage images and is template and layout agnostic overcoming the limitations of enriching ground-truth data with different screenshots. The system enabled by the security manager 20 and security agent 70 allows for an infinite number of identifiers, for example corresponding to brands which could be impersonated by bad actors for phishing purposes. The processes enabled by the security manager 20 and security agent 70 are operable without human intervention and are language agnostic.

Figure 3:
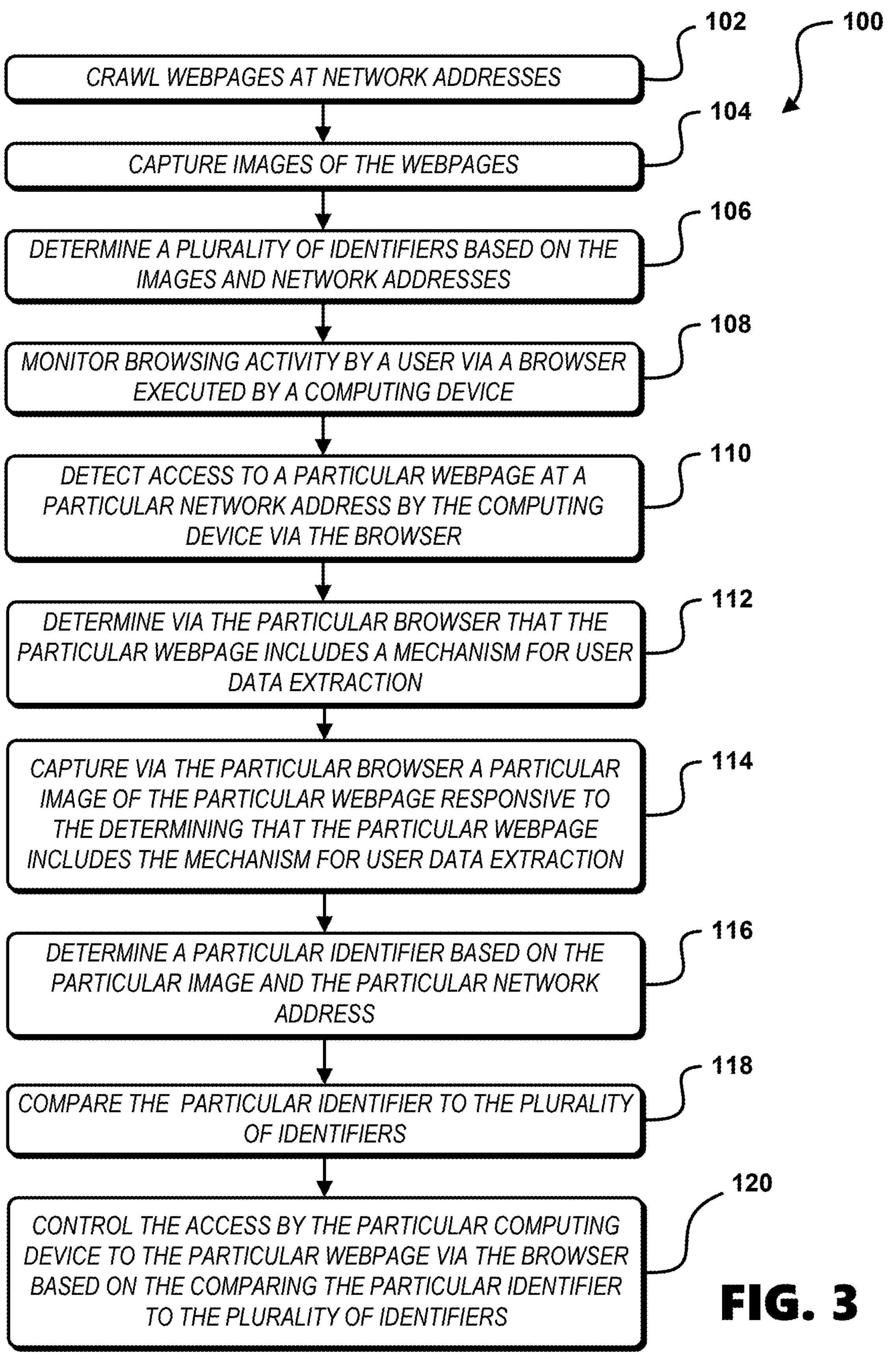
FIGS. 3 and 4 are diagrams showing network-based threat detection and mitigation methods.

Referring to FIG. 3, a method 100 for controlling access to a webpage is provided. The method 100 is described with reference to the components of the environment 10, including the security manager 20 and computing devices 12 including respective security agents 70 which enable the method 100. Alternatively, the method 100 can be performed via other systems and is not restricted to being implemented by the components included in the environment 10.

The method 100 includes crawling a plurality of webpages respectively at a plurality of network addresses on a network (step 102) and capturing a plurality of images of the plurality of webpages, each of the plurality of webpages corresponding to one or more of the plurality of images (step 104). Crawling and capturing the plurality of images are performed for example by the security manager 20 via the crawler 22. A plurality of identifiers are determined based on the plurality of images and the plurality of network addresses (step 106). The plurality of identifiers are for example determined by the identification extractor module 26 and stored in the identifier datastore 34 of the security manager 20. The plurality of identifiers for example respectively correspond to a plurality of brands. Network browsing activity by a particular user is monitored via a particular browser executed by a particular computing device (step 108), for example monitored via a security agent 70 via a browser 50 executed by a computing device 12. Access to a particular webpage at a particular network address is detected by the particular computing device via the particular browser executed by the particular computing device (step 110), for example detected via the security agent 70 via the browser 50 executed by the computing device 12. It is determined via the particular browser that the particular webpage includes one or more mechanisms for user data extraction (step 112), for example determined via the security agent 70 via the browser 50 executed by the computing device 12. The method 100 beneficially includes detecting via the particular browser a field for insertion of credentials on the particular webpage and determining that the particular webpage includes the one or more mechanisms for user data extraction based on the detecting the field for insertion of credentials. One or more particular images of the particular webpage are captured via the particular browser responsive to the determining that the particular webpage includes the one or more mechanisms for user data extraction (step 114), for example captured via the security agent 70 via the browser 50 executed by the computing device 12. One or more particular identifiers are determined based on the one or more particular images and the particular network address (step 116), for example determined via the security agent 70 via the browser 50 executed by the computing device 12. The one or more particular identifiers are compared to the plurality of identifiers (step 118), for example compared via the security agent 70 via the browser 50 executed by the computing device 12. Access by the particular computing device to the particular webpage is controlled via the particular browser based on the comparing of the one or more particular identifiers to the plurality of identifiers (step 120), for example controlling access by the computing device 12 via the security agent 70 via the browser 50. The access by the particular computing device to the particular webpage is controlled for example by blocking the access via an extension to the particular browser, for example blocked by the security agent 70 configured as an extension to the browser 50.

In an implementation of the method 100, network browsing activity by a plurality of users is monitored via a plurality of browsers (e.g., via security agent 70 via browsers 50) executed on a plurality of computing devices (e.g., computing devices 12), a quantity of browsing (e.g., frequency of browsing) the plurality of webpages is determined (e.g., via the candidate identifying module 30) based on the monitoring the network browsing activity, and the plurality of webpages are crawled (e.g., via the crawler 22) based on the quantity of browsing the plurality of webpages of the of the plurality of browsers executed on the plurality of computing devices. The plurality of browsers can include the particular browser and the plurality of computing devices can include the particular computing device.

Figure 4:
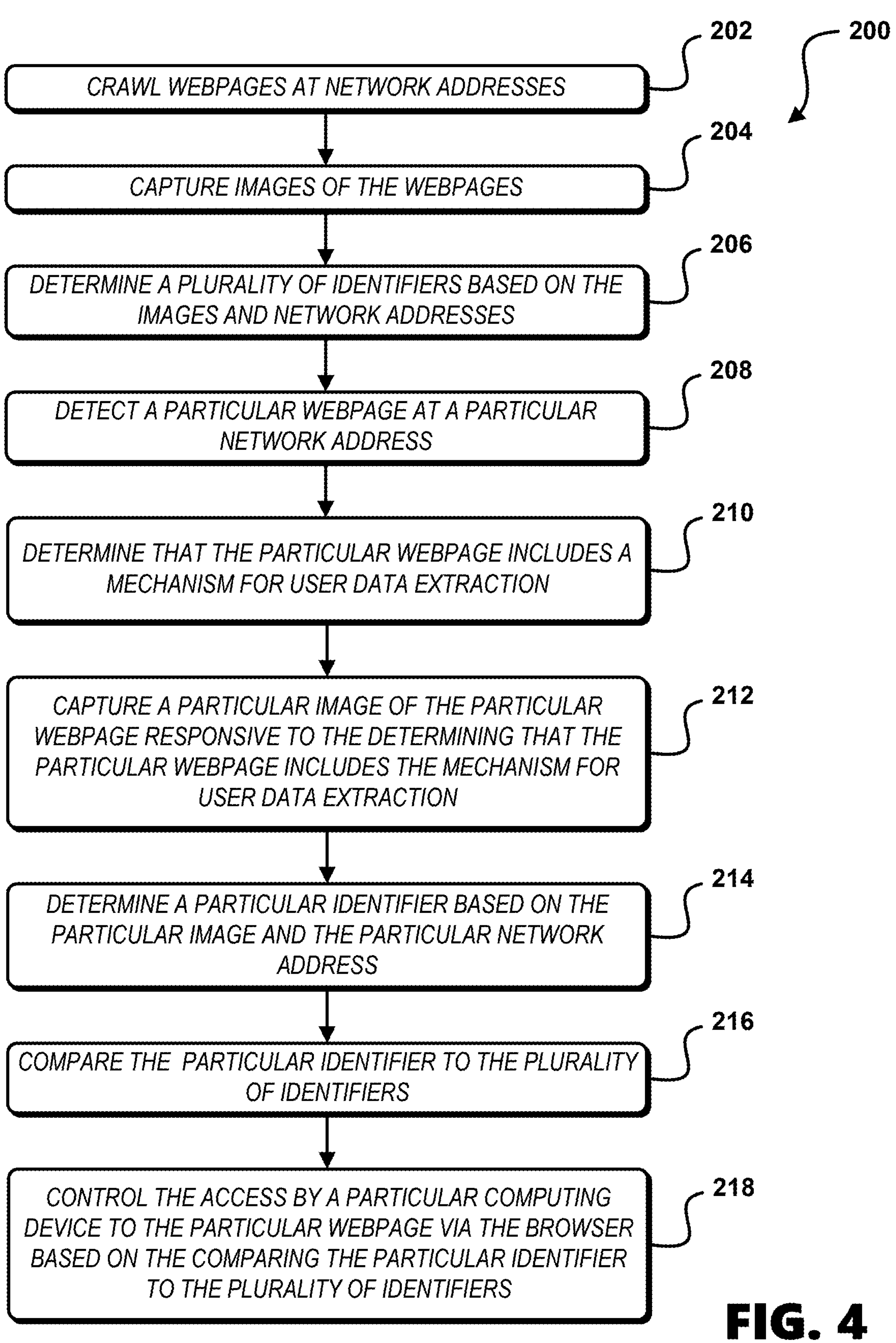

Referring to FIG. 4, a method 200 for controlling access to a webpage is provided. The method 200 is described with reference to the components of the environment 10, including the security manager 20 and computing devices 12 including respective security agents 70 which enable the method 200. Alternatively, the method 200 can be performed via other systems and is not restricted to being implemented by the components included in the environment 10.

The method 200 includes crawling a plurality of webpages respectively at a plurality of network addresses on a network (step 202) and capturing a plurality of images of the plurality of webpages, each of the plurality of webpages corresponding to one or more of the plurality of images (step 204). Crawling and capturing the plurality of images are performed for example by the security manager 20 via the crawler 22. A plurality of identifiers are determined based on the plurality of images and the plurality of network addresses (206). The plurality of identifiers are for example determined by the identification extractor module 26 and stored in the identifier datastore 34 of the security manager 20. The plurality of identifiers for example respectively correspond to a plurality of brands. A particular webpage is detected at a particular network address (step 208), for example detected via the crawler 22 or via the security agent 70 via the browser 50 executed by the computing device 12. It is determined that the particular webpage includes one or more mechanisms for user data extraction (step 210), for example determined via the data extraction intention module 36 or via the security agent 70 via the browser 50 executed by the computing device 12. One or more particular images of the particular webpage are captured responsive to the determining that the particular webpage includes the one or more mechanisms for user data extraction (step 212), for example captured via the data extraction intention module 36 or via the security agent 70 via the browser 50 executed by the computing device 12. One or more particular identifiers are determined based on the one or more particular images and the particular network address (step 214) for example determined via the identification extractor module 26 or via the security agent 70 via the browser 50 executed by the computing device 12. The one or more particular identifiers are compared to the plurality of identifiers (step 216), for example compared via the comparison module 38 or via the security agent 70 via the browser 50 executed by the computing device 12. Access by a particular computing device to the particular webpage is controlled based on the comparing of the one or more particular identifiers to the plurality of identifiers (step 218), for example controlling access by the computing device 12 via the security agent 70 via the browser 50. Controlling the access by the particular computing device to the particular webpage can include blocking the access by the particular computing device to the particular webpage.

In an implementation of the method 200, the method 200 further includes detecting the access to the particular webpage by the particular computing device via a browser (e.g. browser 50) executed by the particular computing device, determining via the browser that the particular webpage includes the one or more mechanisms for user data extraction (e.g., via security agent 70), and controlling the access by the particular computing device to the particular webpage via the browser (e.g., via security agent 70).

In an implementation of the method 200, the method 200 further includes capturing a plurality of source code of the plurality of webpages (e.g., via crawler 22) and determining the plurality of identifiers further based on the plurality of source code (e.g., via identification extractor module 26). One or more particular source code of the particular webpage are captured (e.g., via crawler 22 or security agent 70) responsive to the determining that the particular webpage includes the one or more mechanisms for user data extraction, and the one or more particular identifiers are determined further based on the one or more particular source code (e.g., via identification extractor module 26 or security agent 70).

In an implementation of the method 200, the method 200 further includes capturing a plurality of certificates of the plurality of webpages (e.g., via crawler 22) and determining the plurality of identifiers further based on the plurality of certificates (e.g., via identification extractor module 26). One or more particular certificates of the particular webpage are captured responsive to the determining that the particular webpage includes the one or more mechanisms for user data extraction (e.g., via crawler 22 or security agent 70), and the one or more particular identifiers is determined further based on the one or more particular certificates (e.g., via identification extractor module 26 or security agent 70).

In an implementation of the method 200, the method 200 further includes extracting a plurality of graphic design elements from the plurality of webpages (e.g., via crawler 22) and determining the plurality of identifiers further based on the plurality of graphic design elements (e.g., via identification extractor module 26). A particular graphic design element is extracted from the particular webpage (e.g., via crawler 22 or security agent 70), and the one or more particular identifiers are determined further based on the particular graphic design element (e.g., via identification extractor module 26 or security agent 70).

In an implementation of the method 200, the method 200 further includes comparing the plurality of images of the plurality of webpages and merging two or more of the plurality of identifiers based on the comparing of the plurality of images of the plurality of webpages (e.g., via the comparison module 38 or the security agent 70).

The method 200 can further include monitoring network browsing of a plurality of browsers (e.g., via security agent 70 via browsers 50) on a plurality of computing devices (e.g., computing devices 12), determining a quantity of browsing (e.g., frequency of browsing) the plurality of webpages based on the monitoring the network browsing activity (e.g., via the candidate identifying module 30), and crawling the plurality of webpages based on the quantity of browsing the plurality of webpages of the of the plurality of browsers on the plurality of computing devices (e.g., via crawler 22).

The method 200 can include detecting a field for insertion of credentials on the particular webpage and determining that the particular webpage includes the one or more mechanisms for user data extraction based on the detecting the field for insertion of credentials (e.g., via data extraction intention module 36 or security agent 70). The method 200 can also include applying a large language model (LLM) to the one or more particular images of the particular webpage to determine the one or more mechanisms for user data extraction (e.g., via data extraction intention module 36 or security agent 70). The particular webpage can include source code, and the method 200 can further include applying a large language model (LLM) to the one or more particular images of the particular webpage and the source code of the particular webpage to determine the one or more mechanisms for user data extraction (e.g., via data extraction intention module 36 or security agent 70).

The method 200 can include comparing the one or more particular identifiers to the plurality of identifiers to determine a failure to match the one or more particular identifiers and controlling the access by the particular computing device to the particular webpage (e.g., blocking access to the particular webpage) based on the failure to match the one or more particular identifiers.

In an implementation of the method 200, the method 200 further includes determining one or more names, one or more aliases, one or more logos, and one or more domains of each of a plurality of entities based on the plurality of images and the plurality of network addresses (e.g., via crawler 22) and determining the plurality of identifiers based on the one or more names, the one or more aliases, the one or more logos, and the one or more domains of each of the plurality of entities (e.g., via identification extractor module 26).

The method 200 can include receiving an override request from a user via the particular computing device and unblocking the access by the particular computing device to the particular webpage responsive to the override request (e.g., via security agent 70).

Referring to FIG. 1, the environment 10 enables a network-enabled threat mitigation system including a first computing system including the security manager 20 including at least a first processor and at least a first non-transitory computer readable storage medium having encoded thereon first instructions that when executed by the at least the first processor cause the first computing system to perform a first process. The first process includes crawling a plurality of webpages respectively at a plurality of network addresses on a network, capturing a plurality of images of the plurality of webpages, each of the plurality of webpages corresponding to one or more of the plurality of images, and determining a plurality of identifiers based on the plurality of images and the plurality of network addresses. The plurality of identifiers are stored in the identifier datastore 34. The network-enabled threat mitigation system further includes a second computing system including a computing device 12 including at least a second processor and at least a second non-transitory computer readable storage medium having encoded thereon second instructions that when executed by the at least the second processor cause the second computing system to perform a second process. The second process includes receiving the plurality of identifiers from the first computing system, detecting access to a particular webpage at a particular network address via a particular browser 50, and determining via the particular browser 50 that the particular webpage includes one or more mechanisms for user data extraction. The second process further includes capturing via the particular browser 50 one or more particular images of the particular webpage responsive to the determining that the particular webpage includes the one or more mechanisms for user data extraction and controlling the access to the particular webpage via the particular browser 50 based on the plurality of identifiers, the one or more particular images, and the particular network address.

The first process can further include determining a quantity of accessing by a plurality of computing devices 12 of the plurality of webpages at the plurality of network addresses and crawling the plurality of webpages respectively at the plurality of network addresses on a network based on the quantity of accessing of the plurality of webpages.

The second process can further include determining one or more particular identifiers based on the one or more particular images and the particular network address, comparing the one or more particular identifiers to the plurality of identifiers, and controlling the access to the particular webpage based on the comparing of the one or more particular identifiers to the plurality of identifiers.

Figure 5:
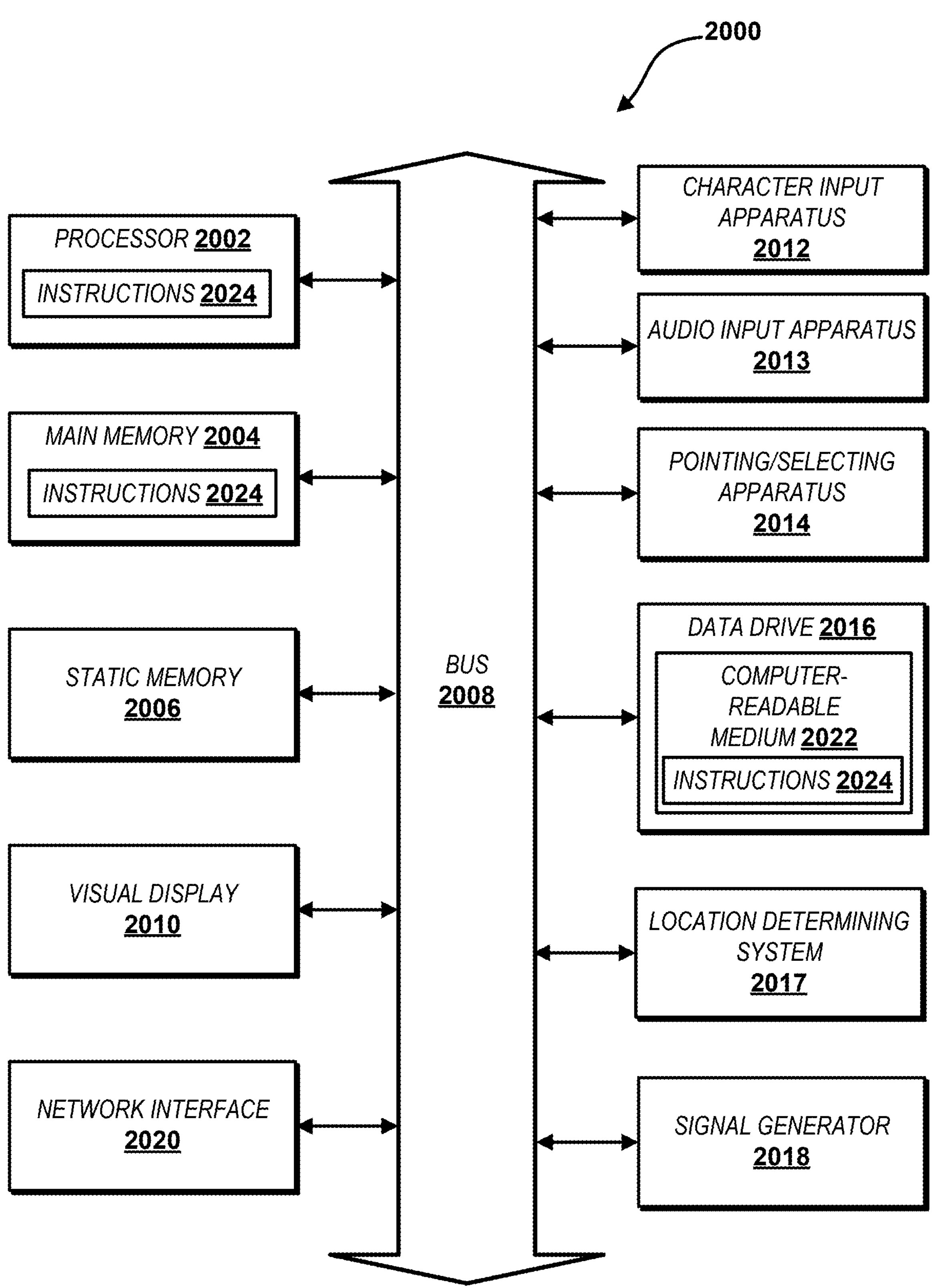
FIG. 5 shows a computer system for performing described methods according to illustrative embodiments.

FIG. 5 illustrates in abstract the function of an exemplary computer system 2000 on which the systems, methods and processes described herein can execute. For example, the computing device 12, security manager 20, web/app servers 40, and website list servers 42 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in a server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), a light emitting diode (LED) display, or a cathode ray tube (CRT) is provided for displaying data to a user of the computer system 2000. The visual display 2010 can be enabled to receive data input from a user, for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:

crawling a plurality of webpages respectively at a plurality of network addresses on a network;

capturing a plurality of images of the plurality of webpages, each of the plurality of webpages corresponding to at least one of the plurality of images;

capturing a plurality of source code of the plurality of webpages;

determining a plurality of identifiers based on the plurality of images, the plurality of source code, and the plurality of network addresses;

monitoring network browsing activity by a particular user via a particular browser executed by a particular computing device;

detecting access to a particular webpage at a particular network address by the particular computing device via the particular browser executed by the particular computing device;

determining via the particular browser that the particular webpage includes at least one mechanism for user data extraction;

capturing via the particular browser at least one particular image of the particular webpage and at least one particular source code of the particular webpage responsive to the determining that the particular webpage includes the at least one mechanism for user data extraction;

determining at least one particular identifier based on the at least one particular image, the at least one particular source code, and the particular network address;

comparing the at least one particular identifier to the plurality of identifiers; and controlling the access by the particular computing device to the particular webpage via the particular browser based on the comparing of the at least one particular identifier to the plurality of identifiers.

2. The method of claim 1, further comprising:

monitoring network browsing activity by a plurality of users via a plurality of browsers executed on a plurality of computing devices;

determining a quantity of browsing the plurality of webpages based on the monitoring the network browsing activity; and crawling the plurality of webpages based on the quantity of browsing the plurality of webpages of the of the plurality of browsers executed on the plurality of computing devices.

3. The method of claim 2, wherein the plurality of browsers comprises the particular browser and the plurality of computing devices comprises the particular computing device.

4. The method of claim 1, further comprising controlling the access by blocking the access via an extension to the particular browser.

5. The method of claim 1, further comprising:

detecting via the particular browser a field for insertion of credentials on the particular webpage; and determining that the particular webpage includes the at least one mechanism for user data extraction based on the detecting the field for insertion of credentials.

6. The method of claim 1, further comprising training a multimodal model based on the plurality of images and the plurality of source code, wherein the determining the at least one particular identifier comprises applying the multimodal model to the at least one particular image and the at least one particular source code.

7. A computer security method comprising:

crawling a plurality of webpages respectively at a plurality of network addresses on a network;

capturing a plurality of images of the plurality of webpages, each of the plurality of webpages corresponding to at least one of the plurality of images;

capturing a plurality of source code of the plurality of webpages;

determining a plurality of identifiers based on the plurality of images, the plurality of source code, and the plurality of network addresses;

detecting a particular webpage comprising a particular source code at a particular network address;

determining that the particular webpage includes at least one mechanism for user data extraction;

capturing at least one particular image of the particular webpage responsive to the determining that the particular webpage includes the at least one mechanism for user data extraction;

determining at least one particular identifier based on the at least one particular image, the particular source code, and the particular network address;

comparing the at least one particular identifier to the plurality of identifiers; and controlling access by a particular computing device to the particular webpage based on the comparing of the at least one particular identifier to the plurality of identifiers.

8. The method of claim 7, further comprising:

detecting the access to the particular webpage by the particular computing device via a browser executed by the particular computing device;

determining via the browser that the particular webpage includes the at least one mechanism for user data extraction; and controlling the access by the particular computing device to the particular webpage via the browser.

9. The method of claim 7, further comprising:

extracting a plurality of graphic design elements from the plurality of webpages;

determining the plurality of identifiers further based on the plurality of graphic design elements;

extracting a particular graphic design element from the particular webpage; and determining the at least one particular identifier further based on the particular graphic design element.

10. The method of claim 7, further comprising:

comparing the plurality of images of the plurality of webpages; and merging at least two of the plurality of identifiers based on the comparing of the plurality of images of the plurality of webpages.

11. The method of claim 7, further comprising:

monitoring network browsing of a plurality of browsers on a plurality of computing devices;

determining a quantity of browsing the plurality of webpages based on the monitoring the network browsing activity; and crawling the plurality of webpages based on the quantity of browsing the plurality of webpages of the of the plurality of browsers on the plurality of computing devices.

12. The method of claim 7, further comprising:

detecting a field for insertion of credentials on the particular webpage; and determining that the particular webpage includes the at least one mechanism for user data extraction based on the detecting the field for insertion of credentials.

13. The method of claim 7, further comprising applying a large language model (LLM) to the at least one particular image of the particular webpage to determine the at least one mechanism for user data extraction.

14. The method of claim 7, further comprising applying a large language model (LLM) to the at least one particular image of the particular webpage and the particular source code of the particular webpage to determine the at least one mechanism for user data extraction.

15. The method of claim 7, further comprising:

comparing the at least one particular identifier to the plurality of identifiers to determine a failure to match the at least one particular identifier; and controlling the access by the particular computing device to the particular webpage based on the failure to match the at least one particular identifier.

16. The method of claim 7, further comprising:

determining at least one name, at least one alias, at least one logo, and at least one domain of each of a plurality of entities based on the plurality of images and the plurality of network addresses; and determining the plurality of identifiers based on the at least one name, the at least one alias, the at least one logo, and the at least one domain of each of the plurality of entities.

17. The method of claim 7, wherein the controlling the access by the particular computing device to the particular webpage comprises blocking the access by the particular computing device to the particular webpage.

18. The method of claim 17, further comprising:

receiving an override request from a user via the particular computing device; and unblocking the access by the particular computing device to the particular webpage responsive to the override request.

19. The method of claim 7, the method further comprising applying a multimodal model to the at least one particular image of the particular webpage and the particular source code of the particular webpage to determine the at least one mechanism for user data extraction.

20. A computer security method comprising:

crawling a plurality of webpages respectively at a plurality of network addresses on a network;

capturing a plurality of images of the plurality of webpages, each of the plurality of webpages corresponding to at least one of the plurality of images;

capturing a plurality of certificates of the plurality of webpages;

determining a plurality of identifiers based on the plurality of images, the plurality of certificates, and the plurality of network addresses;

detecting a particular webpage at a particular network address;

determining that the particular webpage includes at least one mechanism for user data extraction;

capturing at least one particular image of the particular webpage and at least one particular certificate of the particular webpage responsive to the determining that the particular webpage includes the at least one mechanism for user data extraction;

determining at least one particular identifier based on the at least one particular image, the at least one particular certificate, and the particular network address;

comparing the at least one particular identifier to the plurality of identifiers; and controlling access by a particular computing device to the particular webpage based on the comparing of the at least one particular identifier to the plurality of identifiers.

21. A network-enabled threat mitigation system comprising:

a first computing system comprising at least a first processor and at least a first non-transitory computer readable storage medium having encoded thereon first instructions that when executed by the at least the first processor cause the first computing system to perform a first process comprising:

crawling a plurality of webpages respectively at a plurality of network addresses on a network;

capturing a plurality of images of the plurality of webpages, each of the plurality of webpages corresponding to at least one of the plurality of images;

capturing a plurality of source code of the plurality of webpages; and determining a plurality of identifiers based on the plurality of images, the plurality of source code, and the plurality of network addresses;

a second computing system comprising at least a second processor and at least a second non-transitory computer readable storage medium having encoded thereon second instructions that when executed by the at least the second processor cause the second computing system to perform a second process comprising:

receiving the plurality of identifiers from the first computing system;

detecting access to a particular webpage at a particular network address via a particular browser;

determining via the particular browser that the particular webpage includes at least one mechanism for user data extraction;

capturing via the particular browser at least one particular image of the particular webpage and at least one particular source code of the particular webpage responsive to the determining that the particular webpage includes the at least one mechanism for user data extraction; and controlling the access to the particular webpage via the particular browser based on the plurality of identifiers, the at least one particular image, the at least one particular source code, and the particular network address.

22. The network-enabled threat mitigation system of claim 21, wherein the first process further comprises:

determining a quantity of accessing by a plurality of computing devices of the plurality of webpages at the plurality of network addresses; and crawling the plurality of webpages respectively at the plurality of network addresses on a network based on the quantity of accessing of the plurality of webpages.

23. The network-enabled threat mitigation system of claim 21, wherein the second process further comprises:

determining at least one particular identifier based on the at least one particular image, the at least one particular source code, and the particular network address;

comparing the at least one particular identifier to the plurality of identifiers; and controlling the access to the particular webpage based on the comparing of the at least one particular identifier to the plurality of identifiers.

* * * * *